United States Patent [19]

Fukuda et al.

[11] 4,303,942
[45] Dec. 1, 1981

[54] SAMPLING CLOCK REPRODUCING APPARATUS

[75] Inventors: Shin Fukuda, Hirakata; Masayoshi Hirashima, Ibaraki, both of Japan

[73] Assignee: Matsushita Electric Industrial Co., Ltd., Kadoma, Japan

[21] Appl. No.: 155,382

[22] Filed: Jun. 2, 1980

[30] Foreign Application Priority Data

Jun. 6, 1979 [JP] Japan .................................. 54-71522

[51] Int. Cl.³ ........................ H04N 7/04; H04L 7/06; H03B 1/00; H03K 5/00
[52] U.S. Cl. .................................. 358/147; 375/113; 328/138; 328/139
[58] Field of Search ............... 358/142, 146, 147, 133, 358/138, 13; 375/110, 113; 329/104; 328/139, 119, 138; 307/269, 233 R

[56] References Cited

U.S. PATENT DOCUMENTS 4,202,012 5/1980 Hirashima ........................ 358/147

Primary Examiner—John C. Martin
Attorney, Agent, or Firm—Cushman, Darby & Cushman

[57] ABSTRACT

Improved sampling clock reproducing apparatus for receiving digital signal which is superimposed in the television signal during a vertical blanking interval. The sampling clock signal is made by selectively gating a pilot signal from the superimposed signal, obtaining a square thereof, then passing it through a resonance circuit with a resonance frequency twice a repetition frequency of the pilot signal. Thus, the sampling clock signal of the frequency twice the repetition frequency of the pilot signal is obtainable without digital processing attaining high durability against noises.

3 Claims, 11 Drawing Figures

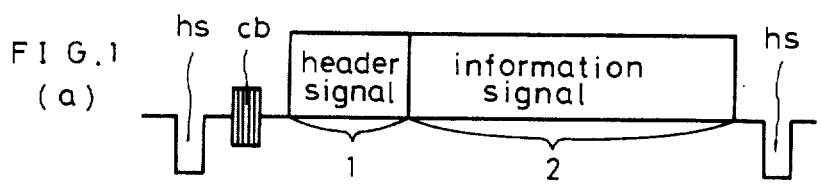
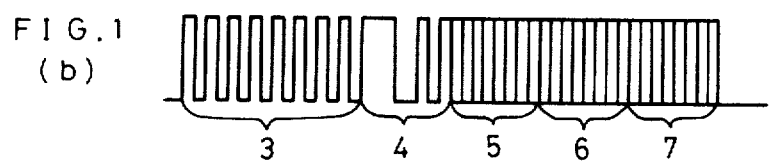
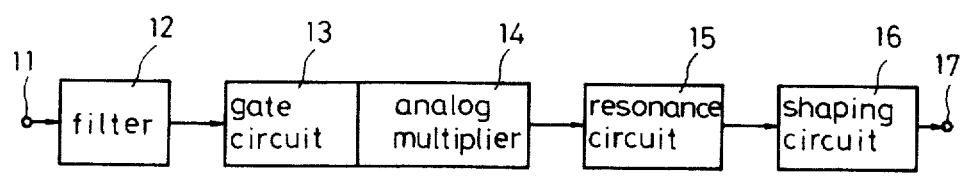

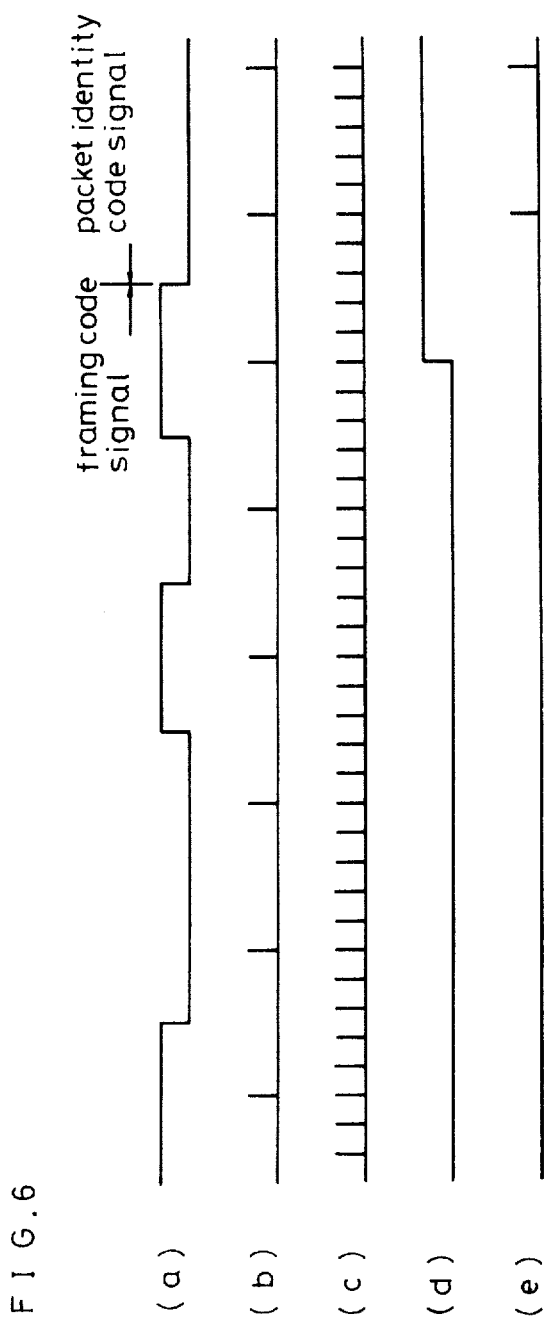

SAMPLING CLOCK REPRODUCING APPARATUS

BACKGROUND OF THE INVENTION

1. Field of the Invention

The present invention relates to an improvement in an apparatus for sampling clock reproducing usable in a television receiver which is provided with an additional receiver for receiving digital signal superimposed on the television signal during the vertical blanking interval.

2. Description of the Prior Art

Broadcasting of an additional signal of character or pattern by superimposing it on the television signal during the vertical blanking interval is known generally as Teletext system, in France as Antiope system or in Japan as NHK (Japan Broadcasting Corporation)'s system of superimposed broadcasting character. The abovementioned system of NHK's superimposed television broadcasting is the system wherein during each vertical blanking interval, information of character or pattern is broadcast in arbitrary one or two horizontal scanning periods (hereinafter referred to as H) between 16th H and 21st H inclusive and also in arbitrary one or two H between 279th H and 284th H inclusive, wherein n-th H indicates n-th horizontal scanning period.

FIG. 1(a) shows one example of an information signal and a header signal preceding thereto, both being superimposed on a television signal during a vertical blanking interval. As shown in FIG. 1(a), between a pair of horizontal synchronization pulse hs and hs, a header part 1 and a subsequent information signal part 2 are disposed following a color burst cb. Detailed constitution of the header part 1 is shown in FIG. 1(b), wherein the header part 1 comprises:

- a clock-run-in signal 3, which is a 16-bit pilot signal,
- a framing code signal 4 which is an 8-bit signal,
- a packet identity code signal 5 which is a 8-bit signal, and channel code signals 6 and 7.

By such system, the information of character or pattern is sent by a television signal as shown in FIG. 1(a) and FIG. 1(b). In order to receive such a signal, the receiver has a measure of reproducing a sampling clock signal with high accuracy. The receiving system disclosed in the same applicant's preceding application (U.S. Pat. Application Ser. No. 882,087, now Pat. No. 4,202,012, UK Patent Application No. 8237/78, West German Patent Application No. P2811260.9 (disclosed in Offenlegungsschrift) and French Patent Application No. 7807429) has the construction that a doubled frequency is made by slicing the clock-run-in signal, treating the sliced wave i.e., for example, differentiating the sliced wave and processing the differentiated pulse signals to obtain a signal with a frequency twice that of the clock-run-in signal, and applying the doubled frequency signal to a resonance circuit of a high Q value and then utilizing the output of the resonance circuit in reproducing the sampling clock signal. However, such a conventional method takes the way of doubling the frequency after producing digital signals (or pulse signal). Therefore, when incoming signal level is weak or its S/N ratio is poor, there is a high possibility of mal-performance caused by noises in the step of processing the pulse signals.

SUMMARY OF THE INVENTION

Accordingly, the present invention is for providing an improved sampling clock reproducing apparatus wherein a doubled frequency signal is produced without treating the incoming signal in a digital processing way thereby to decrease possibility of mal-performance in the digital processing.

BRIEF DESCRIPTION OF THE DRAWINGS

FIG. 1(a) is a time chart of a horizontal scanning period in a vertical blanking interval, showing an information part in the horizontal scanning period together with a header part superimposed on the television signal.

FIG. 1(b) is a time chart showing the detailed constitution of the header part shown in FIG. 1(a).

FIG. 2 is a block diagram of an example apparatus embodying the present invention.

FIG. 6 is a waveform diagram showing signals at various terminals of the signal reproducing apparatus of FIG. 5.

DESCRIPTION OF THE PREFERRED EMBODIMENTS

Figure 3A:
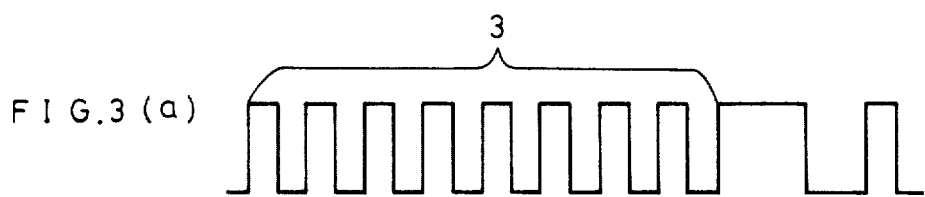
FIG. 3(a), FIG. 3(b), FIG. 3(c), FIG. 3(d), and FIG. 3(e) are waveform diagrams of the signals at the input terminal 11, output terminals of the circuits 12, 14, 15 and 16 of FIG. 2.

A sampling clock reproducing apparatus comprising:
an input terminal for receiving a signal of information sent by being superimposed on a television signal,
a filter connected to said input terminal and having a passing frequency equal to a frequency of a pilot signal which is included in said signal of information and has a reference phase,
an analog multiplier for producing a square of said pilot signal, and
a resonance circuit having a resonance frequency of twice that of said pilot signal and connected to receive an output produced by said analog multiplier to make a resonance therewith, thereby to produce a sampling clock signal.

A sampling clock reproducing apparatus embodying the present invention is now elucidated by referring to FIG. 2 and FIGS. 3(a)–3(e). FIG. 2 is a block diagram of the sampling clock reproducing apparatus. The apparatus comprises an input terminal 11, a filter 12, a gate circuit 13, an analog multiplier 14, a resonance circuit 15, a shaping circuit 16 and an output terminal 17. An information signal with a header signal is applied to the input terminal 11. The filter 12 has such a cut-off frequency as to pass the repetition frequency of a clock-run-in signal as a pilot signal. The gate circuit 13 is used for taking out the clock-run-in signal together with a signal of 1 or 2 bits followed thereafter. The analog multiplier 14 is for multiplying the clock-run-in signal to obtain a signal of a frequency twice as high as the repetition frequency of the clock-run-in signal. The resonance circuit 15 comprising a crystal oscillator has a resonance frequency twice as high as the repetition frequency of the clock-run-in signal.

FIGS. 3(a)–3(e) are waveform diagrams showing signals at the input terminal 11 and output terminals of the circuits 12, 14, 15 and 16 in FIG. 2. FIG. 3(a) shows the signal applied to the input terminal 11, FIG. 3(b) the output signal from the filter 12, FIG. 3(c) the output signal from the analog multiplier 14, FIG. 3(d) the output signal from the resonance circuit 15, and FIG. 3(e) the output signal from the shaping circuit 16, respectively.

Figure 3B:
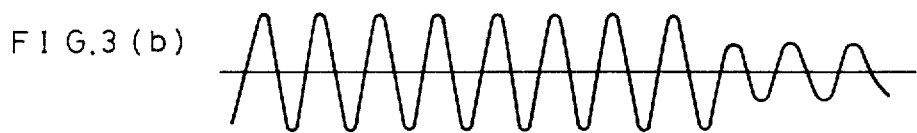
Figure 3C:
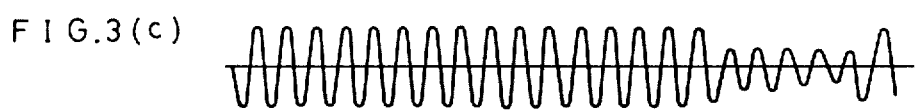
Figure 3D:
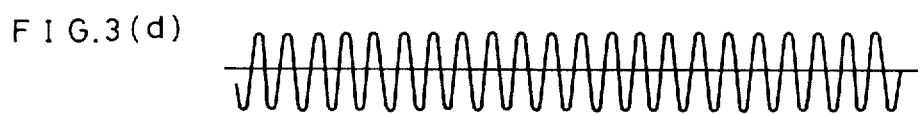
Figure 3E:
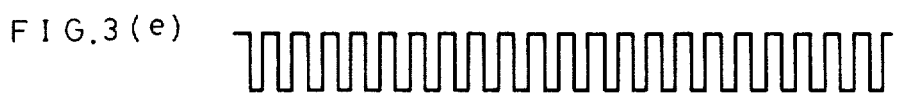

The operation of the apparatus is as follows: By suitably selecting the frequency characteristic of the filter 12, higher harmonics of the repetition frequency of the clock-run-in signal can be filtered out from the input signal by the filter 12, thereby converting the signal waveform to a sine waveform as shown in FIG. 3(b). Then, the gate circuit 13 takes out the clock-run-in signal together with the signal by 1 or 2 bits followed thereafter. The signal of the sine waveform is then fed to the analog multiplier 14. The analog multiplier 14 with two input terminals generates an output signal of (a first input signal $E_1$ times a second input signal $E_2$). Let us suppose now $E_1 = E_2 = \cos\omega t$, then the output signal of the analog multiplier 14 becomes $\cos^2\omega t$ which is equal to $(1+\cos 2\omega t)/2$. Accordingly, the output signal has a frequency twice as high as that of the input signal as shown in FIG. 3(c). Thereafter, the output signal from the analog multiplier 14 is fed to the resonance circuit 15 to generate a ringing oscillation thereby obtaining the oscillation signal as shown in FIG. 3(d). The oscillation signal is appropriately amplified and suitably shaped in the shaping circuit 16. The shaped output signal shown in FIG. 3(e) can be used as a suitable sampling clock signal.

Accordingly, the present invention can provide the improved sampling clock reproducing apparatus wherein the double-frequency signal is produced by the analog multiplier 14 without processing the incoming signal in the conventional digital processing way thereby to decrease possibilities of the mal-performance in the signal reproduction.

Figure 4:
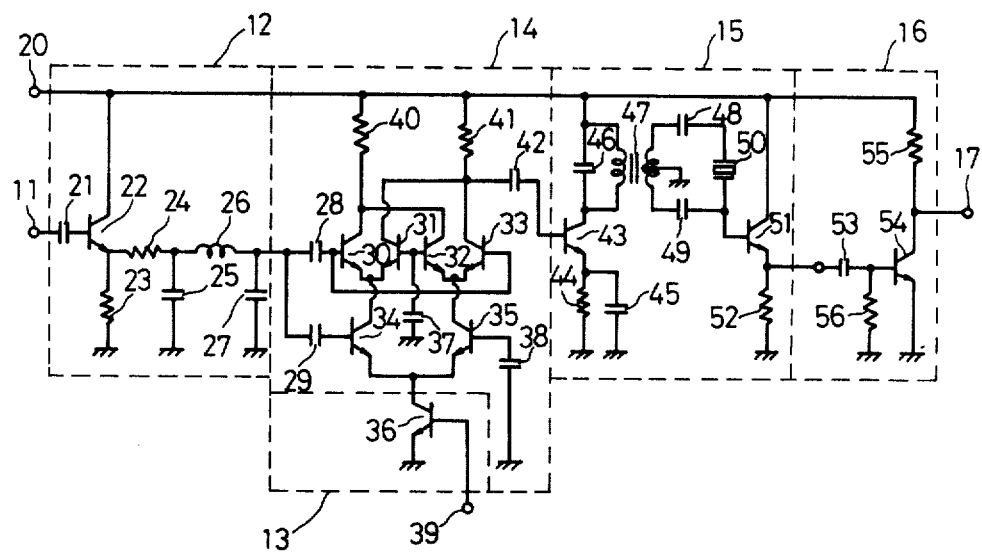
FIG. 4 is an example of a circuit diagram of the apparatus of FIG. 2.

FIG. 4 is an actual circuit diagram, excluding a bias circuit therefor, of the apparatus shown in FIG. 2. In the circuit, the parts designated by numerals 11, 12, 13, 14, 15, 16 and 17 correspond to the parts as shown in FIG. 2. The apparatus comprises a power supply terminal 20, and in the filter part 12 a coupling capacitor 21, a transistor 22, a resistor 23, a resistor 24 for impedance matching, capacitors 25 and 27, and an inductor 26 constituting a filter. The analog multiplier part 14 comprises coupling capacitors 28 and 29, transistors 30, 31, 32, 33, 34 and 35, by-pass capacitors 37 and 38, load resistors 40 and 41, and a coupling capacitor 42. The gate part 13 comprises a transistor 36, which is connected by the base to a gating pulse input terminal 39, and which also constitutes a constant current source transistor for the analog multiplier 14. The resonance circuit 15 comprises a transistor 43, a resistor 44, a peaking capacitor 45, a resonance capacitor 46, a resonance transformer 47, capacitors 48 and 49, a quartz resonance device 50, a buffer transistor 51 and a load resistor 52. The waveform shaping circuit part 16 comprises a coupling capacitor 53, a transistor 54, a load resistor 55 and a resistor 56.

The filter part 12 is a low pass filter designed in a manner that by selecting the values of the capacitors 25 and 27, and the inductor 26, the upper frequency limit is set around the repetition frequency of the clock-run-in signal. The analog multiplier part 14 has a known construction and hence has known operation. Since two input terminals of the analog multiplier 14 are connected in common by the capacitors 28 and 29 to the output terminal of the filter part 12, the analog multiplier 14 produces a signal of the square value of its input signal. The analog multiplier 14 can be replaced by a double ballanced mixer. When a H level gating pulse is impressed from the terminal 39, the transistor 36 becomes on and feeds current to the analog multiplier 14, thereby making it operate. The resonance circuit part 15 is so designed as to have a resonance frequency twice that of the clock-run-in signal, and Q of the resonance circuit part 15 is designed to be very high, so that the ringing oscillation at a doubled frequency continues for a specified period after ceasing of the clock-run-in signal. The output of the ringing oscillation is then shaped by the transistor 54 to issue the sampling clock signal to the output terminal 17. Since the apparatus of FIG. 2 dispenses with digital processing circuits which are not durable to pulsive noises in its principal parts, the present apparatus is highly durable against noise and has a good S/N ratio.

A more practical signal reproducing apparatus in accordance with the present invention will be described below by referring to FIG. 5 and FIG. 6. Generally speaking, it is not always easy to obtain a stable ringing oscillation over one horizontal scanning period. Therefore, the apparatus of FIG. 5 is devised in such a manner that the sampling clock signal produced by the signal reproducing apparatus as described by referring to FIG. 1 is utilized only for the detection of the framing code signals, and thereafter additional sampling clock signal produced in the reproducing apparatus shown in FIG. 5 is used for processing the packet identity code signal and other signals (cf. FIGS. 1(a) and 1(b)).

Figure 5:
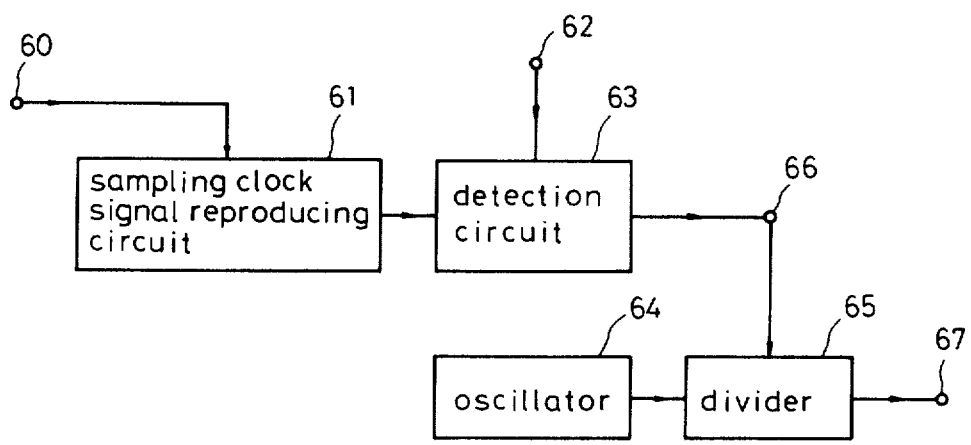
FIG. 5 is a block diagram of another signal reproducing apparatus embodying the present invention.

FIG. 5 is a block diagram of the signal reproducing apparatus embodying the present invention. FIG. 6 is a waveform diagram showing signals at various terminals in the signal reproducing apparatus of FIG. 5. The apparatus comprises a first input terminal 60, a sampling clock signal reproducing circuit 61, a second input terminal 62, a detection circuit 63, an oscillator 64, a divider 65, a third input terminal 66, and an output terminal 67. An information signal is applied to the first input terminal 60. The sampling clock signal reproducing circuit 61 corresponds to the signal reproducing apparatus of FIG. 2 comprising the analog multiplier 14. The information signal is sliced to obtain digital signals and then is applied to the second input terminal 62. The detection circuit 63 comprises a serial-parallel conversion register, and NOT and AND circuits. The serial-parallel conversion register successively processes the sliced information signal from the second input terminal 62 by use of the output signal of the sampling clock signal reproducing circuit 61 as a clock signal. The detection circuit 63 issues a reset signal which turns from a low signal level to a high signal level, when the 8th bit signal of the framing code signal is detected by the detection circuit 63.

The oscillator 64 generates oscillation signals of a frequency 2n times as high as that of the pilot signal. The divider 65 comprises flip flops and generates an output signal of a frequency 1/n times as low as that of an input signal. It is always in a reset state when an input signal at the third terminal 66, i.e. the reset signal from the detection circuit 63 is in the low signal level. The divider 65 is set only when the reset signal is in the high signal level. Accordingly, an output signal at the output terminal has a frequency twice as high as that of the pilot signal, and has a phase equal to that of the output signal from the sampling clock signal reproducing circuit 61.

FIG. 6 is the waveform diagram showing various signals by setting n=5. A signal (a) is a part of waveform around the framing code signal in a header signal (shown in FIG. 1(b)). A signal (b) is the output signal of the sampling clock signal reproducing circuit 61. A signal (c) is the output signal of the oscillator 64. A signal (d) is the output signal from the detection circuit 63. And a signal (e) is the output signal from the divider 65.

The circuit operation of the apparatus of FIG. 5 is further described by referring to FIG. 6. By using the sampling clock signal (shown in (a)) obtained by the sampling clock signal reproducing circuit 61, the reset signal (shown in (d)) is obtained by the detection circuit 63 when it detects the 8th bit of the framing code signal. Since the serial-parallel conversion register in the detection circuit 63 converts the serial information signal to a parallel signal of 8 bits by using the output signal from the sampling clock signal reproducing circuit 61 as a clock signal, and further since the detection circuit 63 issues the reset signal turning from the low signal level to the high signal level when it detects the 8th bit of the framing code signal, so the reset signal has a phase same as that of the output signal from the sampling clock signal reproducing circuit 61 if delay times in the circuits can be ignored. The reset signal from the detection circuit 63 is used to control the operation of the divider 65 through the third input terminal 66. Therefore, the signal (shown in (e)) of the same frequency and the same phase as those of the sampling clock signal is obtainable at the output terminal 67.

Although in an actual circuit operation there exist delay times in the reset signal when its signal level turns from low to high, this delay can be compensated by changing an initial counting number of the divider 65 in such a manner that the divider 65 initially counts fewer number pulses from the oscillator 64 to generate the output signal of the same frequency and the same phase as those of the sampling clock signal as shown in FIG. 6. It is therefore possible to obtain a more stable sampling clock signal by use of the signal reproducing apparatus of FIG. 5. It is naturally possible to obtain a much more stable sampling clock signal when one uses a crystal oscillator circuit in the oscillator 64.

What is claimed is:

1. A sampling clock reproducing apparatus comprising:
    an input terminal for receiving a signal of information sent by being superimposed on a television signal,
    a filter connected to said input terminal and having a passing frequency equal to a frequency of a pilot signal which is included in said signal of information and has a reference phase,
    an analog multiplier for producing a square of said pilot signal, and
    a resonance circuit having a resonance frequency of twice that of said pilot signal and connected to receive an output produced by said analog multiplier to make a resonance therewith, thereby to produce a sampling clock signal.

2. A sampling clock reproducing apparatus in accordance with claim 1, wherein said analog multiplier comprises a switching transistor which is controlled by a gate pulse to turn it on or off and is connected in a current feeding path of said analog multiplier,
    said switching transistor serving as a gate circuit to gate function of said analog multiplier.

3. A sampling clock reproducing apparatus in accordance with claim 1 or 2, which further comprises:
    an oscillator for oscillating a frequency which is 2 N-times that of said pilot signal,
    a detection circuit for detecting a framing code signal included in said signal of information by means of a sampling clock signal based on the resonance in said resonance circuit, and issuing a detection output, and
    a frequency divider for dividing a frequency of an output signal of said oscillator into one N-th frequency, said frequency divider being reset to begin counting of the divided frequency signal upon receiving said detection output from said detection circuit.

* * * * *